United States Patent
Zhou et al.

(10) Patent No.: US 11,482,705 B2
(45) Date of Patent: Oct. 25, 2022

(54) LITHIUM-RICH NEGATIVE ELECTRODE PLATE, ELECTRODE ASSEMBLY AND LITHIUM-ION BATTERY

(71) Applicant: CONTEMPORARY AMPEREX TECHNOLOGY CO., LIMITED, Ningde (CN)

(72) Inventors: Xiang Zhou, Ningde (CN); Jiang Liu, Ningde (CN); Guobao Wang, Ningde (CN); Xiaomei Liu, Ningde (CN); Xianfeng Zheng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 213 days.

(21) Appl. No.: 16/560,729

(22) Filed: Sep. 4, 2019

(65) Prior Publication Data
US 2020/0091519 A1 Mar. 19, 2020

(30) Foreign Application Priority Data
Sep. 13, 2018 (CN) .......................... 201811068060.1

(51) Int. Cl.
*H01M 4/62* (2006.01)
*H01M 4/134* (2010.01)
*H01M 4/36* (2006.01)
*H01M 4/38* (2006.01)
*H01M 10/0525* (2010.01)
*H01M 10/42* (2006.01)
*H01M 4/02* (2006.01)
*H01M 4/1393* (2010.01)
*H01G 11/64* (2013.01)
*H01M 10/0567* (2010.01)
*H01M 4/04* (2006.01)
*H01M 4/583* (2010.01)

(52) U.S. Cl.
CPC .............. *H01M 4/62* (2013.01); *H01M 4/134* (2013.01); *H01M 4/366* (2013.01); *H01M 4/382* (2013.01); *H01M 10/0525* (2013.01); *H01G 11/64* (2013.01); *H01M 4/0445* (2013.01); *H01M 4/1393* (2013.01); *H01M 4/583* (2013.01); *H01M 10/0567* (2013.01); *H01M 2004/021* (2013.01); *H01M 2004/027* (2013.01); *H01M 2010/4292* (2013.01); *Y02E 60/10* (2013.01); *Y02P 70/50* (2015.11); *Y02T 10/70* (2013.01)

(58) Field of Classification Search
CPC .............. H01G 11/64; H01M 10/0525; H01M 10/0567; H01M 2004/021; H01M 2004/027; H01M 2010/4292; H01M 4/0445; H01M 4/133; H01M 4/134; H01M 4/1393; H01M 4/366; H01M 4/382; H01M 4/583; H01M 4/62; Y02E 60/10; Y02T 10/70; Y02P 70/50
See application file for complete search history.

(56) References Cited

U.S. PATENT DOCUMENTS

2008/0118842 A1 * 5/2008 Takezawa ......... H01M 10/0565
429/231.95
2016/0351888 A1 * 12/2016 Wietelmann ...... H01M 10/0569

FOREIGN PATENT DOCUMENTS

| CN | 107834023 A | 3/2008 |
|---|---|---|
| CN | 101609908 A | * 12/2009 |
| CN | 102779975 A | 11/2012 |
| CN | 105244472 A | 1/2016 |
| CN | 103490041 B | 2/2016 |
| CN | 107170957 A | 9/2017 |
| CN | 105336914 B | 7/2018 |
| CN | 108321360 A | 7/2018 |

OTHER PUBLICATIONS

Machine translation of CN101609908A (Year: 2009).*
Contemporary Amperex Technology Co., Limited, First office action EP 2018110680601, dated Aug. 20, 2020, 9 pgs.
Contemporary Amperex Technology Co., Limited, Extended European Search Report, EP19195550.9, dated Jan. 24, 2020, 8 pgs.

* cited by examiner

*Primary Examiner* — Lingwen R Zeng
(74) *Attorney, Agent, or Firm* — Morgan, Lewis & Bockius LLP

(57) ABSTRACT

The present disclosure provides a lithium-rich negative electrode plate, an electrode assembly and a lithium-ion battery, the lithium-rich negative electrode plate comprises a negative electrode collector and a negative electrode film, the negative electrode film is provided on a surface of the negative electrode collector and comprises a negative electrode active material, the lithium-rich negative electrode plate further comprises a layer of lithium metal provided on a surface of the negative electrode film. The negative electrode film further comprises a cyclic ester which is capable of forming a film on the negative electrode plate, a dielectric constant of the cyclic ester is larger than or equal to 10, and a reduction potential of the cyclic ester relative to $Li/Li^+$ is lower than or equal to 1.5V.

14 Claims, No Drawings

LITHIUM-RICH NEGATIVE ELECTRODE PLATE, ELECTRODE ASSEMBLY AND LITHIUM-ION BATTERY

CROSS-REFERENCE TO RELATED APPLICATIONS

The present application claims priority to Chinese patent application No. CN201811068060.1, filed on Sep. 13, 2018, which is incorporated herein by reference in its entirety.

FIELD OF THE PRESENT DISCLOSURE

The present disclosure relates to the field of battery, and more particularly relates to a lithium-rich negative electrode plate, an electrode assembly and a lithium-ion battery.

BACKGROUND OF THE PRESENT DISCLOSURE

With continuous expansion of use fields of consumer electronic products and continuous development of electric vehicles, people have had a growing demand for batteries, what follows is that, the requirement for security performance and service life of batteries is becoming more and more strict. Among the batteries, the lithium-ion battery has many advantages, such as high energy density, high security, long cycle life and the like, so the lithium-ion battery is widely applied in the power system of electric vehicles and large-capacity industrial energy storage system. At present, it has been found that it can significantly improve the service life of the lithium-ion battery by lithium supplementation technology, but because of the specificity of the process of lithium supplementation technology, compared with the conventional lithium-ion battery, the security and stability of the lithium-ion battery get worse after lithium supplementation.

Therefore, it becomes a current research focus that how to develop the lithium-ion battery with higher security and longer service life based on lithium supplementation technology.

SUMMARY OF THE PRESENT DISCLOSURE

In view of the problem existing in the background, an object of the present disclosure is to provide a lithium-rich negative electrode plate, an electrode assembly and a lithium-ion battery, which can improve the film formation effect on the surface of the negative electrode plate, control the lithium intercalation speed of the negative electrode plate, ensure the lithium intercalation uniformity of the negative electrode plate, while increase the bond strength between the negative electrode film and the negative electrode collector.

An another object of the present disclosure is to provide a lithium-rich negative electrode plate, an electrode assembly and a lithium-ion battery, which can improve security and stability of the lithium-ion battery, while also ensure the longer cycle life and storage life of the lithium-ion battery.

In order to achieve the above object, in a first aspect of the present disclosure, the present disclosure provides a lithium-rich negative electrode plate which comprises a negative electrode collector and a negative electrode film, the negative electrode film is provided on a surface of the negative electrode collector and comprises a negative electrode active material, the lithium-rich negative electrode plate further comprises a layer of lithium metal provided on a surface of the negative electrode film. Wherein, the negative electrode film further comprises a cyclic ester which is capable of forming a film on the negative electrode plate, a dielectric constant of the cyclic ester is larger than or equal to 10, and a reduction potential of the cyclic ester relative to $Li/Li^+$ is lower than or equal to 1.5V.

In a second aspect of the present disclosure, the present disclosure provides an electrode assembly which comprises the lithium-rich negative electrode plate according to the first aspect of the present disclosure, a positive electrode plate and a separator, wherein the separator is provided between the negative electrode plate and the positive electrode plate.

In a third aspect of the present disclosure, the present disclosure provides a lithium-ion battery which comprises a negative electrode plate, a positive electrode plate, a separator and an electrolyte. Wherein, the negative electrode plate comprises a negative electrode collector and a negative electrode film, the negative electrode film is provided on a surface of the negative electrode collector and comprises a negative electrode active material, the positive electrode plate comprises a positive electrode collector and a positive electrode film, the positive electrode film is provided on a surface of the positive electrode collector and comprises a positive electrode active material, the separator is provided between the negative electrode plate and the positive electrode plate. Wherein, the negative electrode plate is a pre-lithium-intercalation negative electrode plate, the negative electrode film further comprises a cyclic ester which is capable of forming a film on the negative electrode plate, a dielectric constant of the cyclic ester is greater than or equal to 10, and a reduction potential of the cyclic ester relative to $Li/Li^+$ is lower than or equal to 1.5V.

Compared with the technologies in the background, the present disclosure at least contains the following beneficial effects.

The negative electrode film of the present disclosure contains a cyclic ester which is capable of forming a film on the negative electrode plate, the cyclic ester can be partly consumed and preferentially form a SEI film on the surface of the negative electrode plate when lithium is intercalated into the negative electrode plate, so the speed of the lithium intercalation of the negative electrode plate can be effectively controlled, the uniformity of the lithium intercalation of the negative electrode plate can be ensured, while the bond strength between the negative electrode film and the negative electrode collector can also be increased, the bond force of the negative electrode plate is improved. The cyclic ester which has not been consumed in the forming process of the SEI film is remained in the negative electrode film, and continues to participate in the dissolving-repairing process of the SEI film on the surface of the negative electrode plate in the subsequent cycle process of the lithium-ion battery, so the cycle life and the storage life of the lithium-ion battery can be well improved.

In the present disclosure, adding the cyclic ester into the negative electrode film directly can sufficiently infiltrate the internal porosity of the negative electrode plate and the surface of the negative electrode active material, which in turn is beneficial to preferentially form a SEI film with better performance on the surface of the negative electrode plate, this not only can effectively improve the film formation effect on the surface of the negative electrode plate, improve security and stability of the lithium-ion battery, but also can ensure that the lithium-ion battery has a longer cycle life and storage life.

DETAILED DESCRIPTION

Hereinafter, a lithium-rich negative electrode plate, an electrode assembly and a lithium-ion battery according to the present disclosure are described in detail.

Firstly, a lithium-rich negative electrode plate according to a first aspect of the present disclosure is described, and comprises a negative electrode collector and a negative electrode film, the negative electrode film is provided on a surface of the negative electrode collector and comprises a negative electrode active material, the lithium-rich negative electrode plate further comprises a layer of lithium metal provided on the surface of the negative electrode film. Wherein, the negative electrode film further comprises a cyclic ester which is capable of forming a film on the negative electrode plate, a dielectric constant of the cyclic ester is larger than or equal to 10, and a reduction potential of the cyclic ester relative to $Li/Li^+$ is lower than or equal to 1.5V.

The cyclic ester of the negative electrode film is a cyclic ester which is capable of forming a film on the negative electrode plate, the cyclic ester can be partly consumed and preferentially form a SEI film on the surface of the negative electrode plate when lithium is intercalated into the negative electrode plate (when an electrolyte is injected into a battery, the lithium metal on the surface of the negative electrode film immediately undergoes a rapid lithium intercalation reaction), so the speed of the lithium intercalation of the negative electrode plate can be effectively controlled, the uniformity of the lithium intercalation of the negative electrode plate can be ensured, while the bond strength between the negative electrode film and the negative electrode collector can also be increased, the bond force of the negative electrode plate is improved. The cyclic ester which has not been consumed in the forming process of the SEI film is remained in the negative electrode film, and continues to participate in the dissolving-repairing process of the SEI film on the surface of the negative electrode plate in the subsequent cycle process of the lithium-ion battery, so the cycle life and the storage life of the lithium-ion battery can be well improved. In addition, adding the cyclic ester into the negative electrode film directly can sufficiently infiltrate the internal porosity of the negative electrode plate and the surface of the negative electrode active material, which in turn is beneficial to preferentially form a SEI film with better performance on the surface of the negative electrode plate, for example increasing the uniformity and density of the SEI film, this not only can effectively improve the film formation effect on the surface of the negative electrode plate, improve security and stability of the lithium-ion battery, but also can ensure that the lithium-ion battery has a longer cycle life and storage life.

In the lithium-rich negative electrode plate according to the first aspect of the present disclosure, the reduction potential of the cyclic ester relative to $Li/Li^+$ is lower than or equal to 1.5V, which is beneficial to ensure that the cyclic ester can preferentially form a SEI film on the surface of the negative electrode plate when the electrolyte is injected into the lithium-ion battery, increase the film quality of the SEI film, improve the film formation effect on the surface of the negative electrode plate. Preferably, the reduction potential of the cyclic ester relative to $Li/Li^+$ is 1.5V~0.9V.

In the lithium-rich negative electrode plate according to the first aspect of the present disclosure, preferably, the cyclic ester is one or more selected from a group consisting of cyclic carbonate, cyclic sulfate, cyclic sulfite and cyclic carboxylate. More preferably, the cyclic ester is one or more specifically selected from a group consisting of ethylene carbonate, vinylene carbonate, propylene carbonate, butylene carbonate, ethylene sulfate, ethylene sulfite, propylene sulfite and γ-butyrolactone.

In the lithium-rich negative electrode plate according to the first aspect of the present disclosure, preferably, a content of the cyclic ester is 0.1%~10% of a mass of the negative electrode active material; more preferably, the content of the cyclic ester is 1%~5% of the mass of the negative electrode active material; further preferably, the content of the cyclic ester is 2%~3% of the mass of the negative electrode active material. The content of the cyclic ester should not be too much, otherwise which can easily make the flowability of the slurry of the negative electrode film increases, make the bond strength between the negative electrode plate and the negative electrode collector decrease, and in turn the bond force of the negative electrode plate become worse, the stability of the negative electrode plate is obviously decreased during a long-term use.

In the lithium-rich negative electrode plate according to the first aspect of the present disclosure, preferably, the negative electrode active material may at least comprise a carbon-based negative electrode material; more preferably, the carbon-based negative electrode material is one or more selected from a group consisting of natural graphite, artificial graphite, soft carbon, hard carbon, mesocarbon microbeads, nanocarbon and carbon fiber. Besides the carbon-based negative electrode material, the negative electrode active material may further comprise one or more selected from a group consisting of silicon-based material, tin-based material and lithium titanate. Wherein, preferably, the silicon-based material is one or more selected from a group consisting of an elemental silicon, a silicon oxide compound and a silicon carbon composite and a silicon alloy, the tin-based material is one or more selected from a group consisting of an elemental tin, a tin oxide compound, a tin carbon composite and a tin alloy.

In the lithium-rich negative electrode plate according to the first aspect of the present disclosure, preferably, the negative electrode active material may only be a carbon-based negative electrode material; more preferably, the negative electrode active material is natural graphite, artificial graphite or a mixture thereof.

In the lithium-rich negative electrode plate according to the first aspect of the present disclosure, the negative electrode film may be provided on one surface of the negative electrode collector, also may be provided on two surfaces of the negative electrode collector. The negative electrode film may further comprise a binder and a conductive agent, the type of the binder and the conductive agent are not specifically limited, and may be selected according to actual need. Preferably, the binder specifically may be one or more selected from a group consisting of styrene butadiene rubber (SBR) and sodium carboxymethyl cellulose (CMC). Preferably, the conductive agent specifically may be one or more selected from a group consisting of conductive carbon black, superconductive carbon black, conductive graphite, acetylene black, ketjen black, graphene and carbon nanotube. The type of the negative electrode collector is also not specifically limited, and may be selected according to actual need, preferably, a copper foil may be used.

In the lithium-rich negative electrode plate according to the first aspect of the present disclosure, the source and the shape of the layer of lithium metal provided on the surface of the negative electrode film are not limited. The source of the lithium metal is one or more selected from a group consisting of a powder-form lithium and a plate-form lithium. When the lithium metal is a powder-form lithium, usually the powder-form lithium may be uniformly distributed on the surface of the negative electrode film by vibrating, then the powder-form lithium is adhered on the surface of the negative electrode film by cold pressing of a roll pair to form a layer of lithium metal. When the lithium metal is a plate-form lithium, usually a thicker lithium plate is sufficiently plastically formed to a thinner lithium plate and then uniformly laid on the surface of the negative electrode film, then the lithium plate is adhered onto the surface of the negative electrode film by cold pressing of a roll pair to form a layer of lithium metal, the thicker lithium plate may sufficiently control the actual thickness of the lithium plate after fully plastic formed, and in turn accurately control the mass of the lithium supplementation.

In the lithium-rich negative electrode plate according to the first aspect of the present disclosure, the layer of lithium metal provided on the surface of the negative electrode film is not necessarily densely and uniformly distributed on the surface of the negative electrode film. For example, when the lithium metal is a powder-form lithium, there may be a certain gap among the powder-form lithium particles on the surface of the negative electrode film, a size of the gap may be controlled within 1 μm~5000 μm. When the lithium metal is a plate-form lithium, a plurality of lithium plates (or lithium strips) also may be intermittently cover the surface of the negative electrode film with an interval therebeween, the interval between the lithium plates (or lithium strips) may be controlled within 1 μm~5000 μm, after the electrolyte is injected, after a long period of infiltration and diffusion, the lithium in the lithium-rich region (at the position of lithium plates or lithium strips) will diffuse into the non-lithium-rich region (at the position of the interval), finally the lithium content of the negative electrode film still may achieve uniformity.

In the lithium-rich negative electrode plate according to the first aspect of the present disclosure, preferably, a mass of the lithium metal may be 0.5%~5% of a total mass of the negative electrode film. The higher the mass of the lithium metal, the more easily the lithium is precipitated on the negative electrode plate.

In the lithium-rich negative electrode plate according to the first aspect of the present disclosure, when preparing the lithium-rich negative electrode plate, the negative electrode active material, the conductive agent, the binder and the cyclic ester may be directly uniformly mixed in a solvent, then coated on the surface of the negative electrode collector, and the solvent is removed by drying to obtain a negative electrode film, next a layer of lithium metal is further provided on the surface of the negative electrode film to complete the preparation of the lithium-rich negative electrode plate. Wherein, the order of adding the negative electrode active material, the conductive agent, the binder, the cyclic ester and the solvent is not limited, the negative electrode active material, the conductive agent, the binder and the cyclic ester may all be pre-mixed and then directly added into the solvent, a part of the negative electrode active material, the conductive agent, the binder and the cyclic ester also may be pre-mixed, added into the solvent and stirred uniformly, and then the remaining part thereof is added.

In the lithium-rich negative electrode plate according to the first aspect of the present disclosure, when preparing the lithium-rich negative electrode plate, the negative electrode active material, the conductive agent, the binder and the cyclic ester may also be directly uniformly mixed in a solvent, then coated on the surface of the negative electrode collector, and the solvent is removed by drying to obtain a negative electrode film, next the cyclic ester is pre-diluted in the solvent to obtain a pre-mixed solution, then the pre-mixed solution is coated on the surface of the negative electrode film, dried again to removed the solvent in the pre-mixed solution, finally a layer of lithium metal is further provided on the surface of the negative electrode film to complete the preparation of the lithium-rich negative electrode plate.

In the lithium-rich negative electrode plate according to the first aspect of the present disclosure, when preparing the lithium-rich negative electrode plate, an initial added content of the cyclic ester may be greater than 10%, because a small part of the cyclic ester will be inevitably volatilized during the process of drying to remove the solvent (usually deionized water), as long as ensuring that the content of the cyclic ester finally remained in the negative electrode film is 0.1%~10% of the mass of the negative electrode active material. In addition, because the drying temperature of the solvent in the preparation of the negative electrode plate is usually 80° C.~130° C., preferably, the boiling point of the cyclic ester is greater than or equal to 150° C., so that the loss of the cyclic ester can be avoided due to a large amount of volatilization during the drying process of the solvent, while it may also avoid a large amount of volatilization of the cyclic ester endangering human body health.

Secondly, an electrode assembly according to a second aspect of the present disclosure is described, the electrode assembly comprises the lithium-rich negative electrode plate according to the first aspect of the present disclosure, a positive electrode plate and a separator, wherein the separator is provided between the negative electrode plate and the positive electrode plate.

In the electrode assembly according to the second aspect of the present disclosure, the positive electrode plate comprises a positive electrode collector and a positive electrode film, the positive electrode film is provided on the surface of the positive electrode collector and comprises a positive electrode active material, wherein the positive electrode film may be provided on one surface of the positive electrode collector, also may be provided on two surfaces of the positive electrode collector. The positive electrode film further comprises a conductive agent and a binder, the types of the binder and the conductive agent are not specifically limited, and may be selected according to actual need. Preferably, the binder specifically may be one or more selected from a group consisting of polyvinylidene fluoride (PVDF), polytetrafluoroethylene, terpolymer of vinylidene fluoride-tetrafluoroethylene-propylene, terpolymer of vinylidene fluoride-hexafluoropropylene-tetrafluoroethylene, copolymer of tetrafluoroethylene-hexafluoropropylene and fluorinated acrylate resin. Preferably, the conductive agent may be one or more specifically selected from a group consisting of conductive carbon black, superconductive carbon black, conductive graphite, acetylene black, ketjen black, graphene and carbon nanotube. The type of the positive electrode collector is also not specifically limited, and may be selected according to actual need, preferably a aluminum foil may be used.

Wherein, the specific type of the positive electrode active material is not particularly limited, as long as it can satisfy the intercalation and deintercalation of lithium ions. The positive electrode active material may be a layered-structure material which makes lithium ions diffuse in a two-dimensional space or also a spinel-structure which makes lithium ions diffuse in a three-dimensional space. Preferably, the positive electrode active material may be one or more selected from a group consisting of a lithium transition metal oxide, a compound obtained by adding other transition metal or non-transition metal or non-metal into the lithium transition metal oxide. Specifically, the positive electrode active material may be one or more selected from a group consisting of lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate.

Preferably, the positive electrode active material is olivine-type lithium-containing phosphate. This is because that the olivine-type lithium-containing phosphate itself has a higher structural stability, does not cause a capacity loss due to the structural change as other positive electrode active materials in the cycle process of the lithium-ion battery, therefore the capacity decay of a lithium-ion battery of the olivine-type lithium-containing phosphate is mainly from the loss of the active lithium that can transmit between the positive electrode plate and the negative electrode plate inside the lithium-ion battery (for example, lithium ions are lost due to participation in the formation of the SEI film on the surface of the negative electrode), therefore, when the positive electrode active material is a olivine-type lithium-containing phosphate, the capacity loss of the lithium-ion battery may be further reduced, and the cycle life and the storage life of the lithium-ion battery may be greatly improved.

A general formula of the olivine-type lithium-containing phosphate may be $LiFe_{1-x-y}Mn_xM'_yPO_4$, $0 \leq x \leq 1$, $0 \leq y < 1$, $0 \leq x+y \leq 1$, M' is one or more selected from a group consisting of other transition metal element except for Fe and Mn or non-transition metal element, M' is one or more preferably selected from a group consisting of Cr, Mg, Ti, Al, Zn, W, Nb and Zr. Further preferably, the olivine-type lithium-containing phosphate is one or more selected from a group consisting of lithium iron phosphate, lithium manganese phosphate and lithium ferric manganese phosphate.

In the electrode assembly according to the second aspect of the present disclosure, preferably, a capacity of the negative electrode active material per unit area/(a capacity of the positive electrode active material per unit area+a capacity of the lithium metal on the surface of the negative electrode film per unit area×80%)≥1.10. Thus after the electrode assembly is placed into the case and the electrolyte is injected, the lithium metal and the negative electrode active material (or a part of the negative electrode active material) immediately undergoes a rapid lithium intercalation reaction, the lithium metal or a part of the lithium metal on the surface of the negative electrode film will exist in the finished battery in a form of pre-lithium-intercalation compound. When the battery is fully charged during the use process, the negative electrode active material may have sufficient vacancies to receive all lithium ions deintercalated from the positive electrode active material, and after the fully discharged, the excessive lithium ions are stored in the negative electrode plate, so the capacity loss of the battery can be more effectively reduced, and the cycle life and the storage life of the battery can be further improved. Because the capacity of the lithium metal on the surface of the negative electrode film is difficult to be fully exerted, when the battery design is performed, different capacities of the positive and negative electrode active material are designed according to 80% of the lithium metal capacity, and a battery with better cycle life and storage life can be obtained.

It should be noted that, when the layer of lithium metal provided on the surface of the negative electrode film is not completely densely and uniformly distributed on the surface of the negative electrode film, in the calculation process of the capacity of the lithium metal on the surface of the negative electrode film per unit area, a mass of the lithium metal on the surface of the negative electrode film per unit area refers to a ratio of a total mass of the layer of the lithium metal provided on the negative electrode film to a total area of the negative electrode film.

Further preferably, the capacity of the negative electrode active material per unit area/the capacity of the positive electrode active material per unit area=1.2~2.1; more further preferably, the capacity of the negative electrode active material per unit area/the capacity of the positive electrode active material per unit area=1.3~2.1.

Where the capacity of the negative electrode active material per unit area=a coating mass of the negative electrode plate per unit area×a mass percentage of the negative electrode active material (i.e. a mass percentage of the negative electrode active material in the negative electrode film)×a gram capacity of the negative electrode active material; the capacity of the positive electrode active material per unit area=a coating mass of the positive electrode plate per unit area×a mass percentage of the positive electrode active material (i.e. the mass percentage of the positive electrode active material in the positive electrode film)×a gram capacity of the positive electrode active material; the capacity of the lithium metal on the surface of the negative electrode film per unit area=a theoretical gram capacity (i.e. 3861.3 mAh/g) of the lithium metal×the mass of the lithium metal provided on the surface of the negative electrode film per unit area.

Where, the gram capacities of the positive and negative electrode active materials may be tested according to the relevant national standards.

In the electrode assembly according to the second aspect of the present disclosure, the type of the separator is not specifically limited, and may be any separator material used in current lithium-ion battery, such as polyethylene, polypropylene, polyvinylidene fluoride and a multilayer composite film thereof, but not limited thereto. The separator can be used either as a bare film made of these material or as the bare film with a coating thereon, the coating varies depending on the use conditions of the separator, such as a ceramic coating or also an organic coating.

Next A lithium-ion battery according to a third aspect of the present disclosure is described, the lithium-ion battery comprises a negative electrode plate, a positive electrode plate, a separator and an electrolyte. Wherein the negative electrode plate comprises a negative electrode collector and a negative electrode film, the negative electrode film is provided on a surface of the negative electrode collector and comprises a negative electrode active material, the positive electrode plate comprises a positive electrode collector and a positive electrode film, the positive electrode film is provided on a surface of the positive electrode collector and comprises a positive electrode active material, the separator is provided between the negative electrode plate and the positive electrode plate. Wherein the negative electrode plate is a pre-lithium-intercalation negative electrode plate, the negative electrode film further comprises a cyclic ester which is capable of forming a film on the negative electrode, a dielectric constant of the cyclic ester is greater than or equal to 10, and a reduction potential of the cyclic ester relative to $Li/Li^+$ is lower than or equal to 1.5V.

The cyclic ester of the negative electrode film is a cyclic ester which is capable of forming a film on the negative electrode plate, the cyclic ester can preferentially forms a SEI film on the surface of the negative electrode plate when lithium is intercalated into the negative electrode plate, and the speed of the lithium intercalation of the negative electrode plate can be effectively controlled, the uniformity of the lithium intercalation of the negative electrode plate can be ensured; the cyclic ester which has not been consumed in the forming process of the SEI film is remained in the negative electrode film, and continues to participate in the dissolving-repairing process of the SEI film on the surface of the negative electrode plate in the subsequent cycle process of the battery, so the cycle life and the storage life of the lithium-ion battery can be well improved. In addition, adding the cyclic ester into the negative electrode film directly can sufficiently infiltrate the internal porosity of the negative electrode plate and the surface of the negative electrode active material, which in turn is beneficial to preferentially form a SEI film with better performance on the surface of the negative electrode plate, for example increasing the uniformity and densification of the SEI film, this not only can effectively improve the film formation effect on the surface of the negative electrode plate, improve security and stability of the lithium-ion battery, but also can ensure that the lithium-ion battery has a longer cycle life and storage life.

The cyclic ester in the negative electrode film may also effectively increase the bond strength between the negative electrode film and the negative electrode collector, improve the bond force of the negative electrode plate. Wherein, preferably, a peel force between the negative electrode film and the negative electrode collector is greater than or equal to 10 N/m; more preferably, the peel force between the negative electrode film and the negative electrode collector is greater than or equal to 11 N/m.

The reduction potential of the cyclic ester relative to $Li/Li^+$ is lower than or equal to 1.5V, which is beneficial to ensure that the cyclic ester can preferentially form a SEI film on the surface of the negative electrode plate when the electrolyte is injected into the battery, increase the film quality of the SEI film, improve the film formation effect on the surface of the negative electrode plate. Preferably, the reduction potential of the cyclic ester relative to $Li/Li^+$ is 1.5V~0.9V.

Preferably, the cyclic ester is one or more selected from a group consisting of cyclic carbonate, cyclic sulfate, cyclic sulfite and cyclic carboxylate. More preferably, the cyclic ester is one or more specifically selected from a group consisting of ethylene carbonate, vinylene carbonate, propylene carbonate, butylene carbonate, ethylene sulfate, ethylene sulfite, propylene sulfite and γ-butyrolactone.

Preferably, a content of the cyclic ester is 0.1%~10% of a mass of the negative electrode active material; more preferably, the content of the cyclic ester is 1%~5% of the mass of the negative electrode active material; further preferably, the content of the cyclic ester is 2%~3% of the mass of the negative electrode active material. The content of the cyclic ester should not be too much, otherwise which can easily make the viscosity and flowability of the negative electrode slurry increases, make the bond strength between the negative electrode plate and the negative electrode collector decrease, and the bond force of the negative electrode plate become worse, the stability of the negative electrode plate is obviously decreased during a long-term use, which is not beneficial to the improvement of the performance of the lithium battery.

In the lithium-ion battery according to the third aspect of the present disclosure, the negative electrode active material at least comprises a carbon-based negative electrode material, and the carbon-based negative electrode material in the negative electrode film exists in a form of a pre-lithium-intercalation compound $LiC_x$ formed by lithiation with a lithium metal, 12≤x≤150.

The carbon-based negative electrode material is one or more selected from a group consisting of natural graphite, artificial graphite, soft carbon, hard carbon, mesocarbon microbeads, nanocarbon and carbon fiber. Besides the carbon-based negative electrode material, the negative electrode active material may further comprise one or more selected from a group consisting of silicon-based material, tin-based material and lithium titanate. Wherein, preferably, the silicon-based material is one or more selected from a group consisting of an elemental silicon, a silicon oxide compound and a silicon carbon composite and a silicon alloy, the tin-based material is one or more selected from a group consisting of an elemental tin, a tin oxide compound, a tin carbon composite and a tin alloy.

The negative electrode active material may only be a carbon-based negative electrode material; preferably, the negative electrode active material is natural graphite, artificial graphite or a mixture thereof.

In the pre-lithium-intercalation compound $LiC_x$, when x<12, the carbon-based negative electrode material has a higher degree of pre-lithium-intercalation, and the lithium metal residue is prone to occur on the surface of the negative electrode plate, causing a safety hazard; when x>150, the carbon-based negative electrode material has a lower degree of pre-lithium-intercalation, and the improvement effect on the cycle life of the lithium-ion battery is not significant. Preferably, in the pre-lithium intercalation compound $LiC_x$, 12≤x≤50.

In the lithium-ion battery according to the third aspect of the present disclosure, preferably, a capacity of the negative electrode active material per unit area/(a capacity of the positive electrode active material per unit area+a capacity of active lithium ions of the pre-lithium-intercalation compound $LiC_x$ which can be intercalated and deintercalated in the negative electrode film per unit area)≥1.10, thus after the lithium-ion battery is fully charged during the use process, the negative electrode active material can have sufficient vacancies to receive all lithium ions deintercalated from the positive electrode active material, and store excessive lithium ions in the negative electrode active material after the lithium-ion battery is fully discharged, therefore the capacity loss of the lithium-ion battery can be further reduced, and the cycle life and the storage life of the lithium-ion battery can be improved.

Where the capacity of the negative electrode active material per unit area=a coating mass of the negative electrode plate per unit area×a mass percentage of the negative electrode active material (i.e. a mass percentage of the negative electrode active material in the negative electrode film)×a gram capacity of the negative electrode active material; the capacity of the positive electrode active material per unit area=a coating mass of the positive electrode plate per unit area×a mass percentage of the positive electrode active material (i.e. the mass percentage of the positive electrode active material in the positive electrode film)×a gram capacity of the positive electrode active material.

Where, the gram capacities of the positive and negative electrode active materials may be tested according to the relevant national standards.

The capacity of active lithium ions of the pre-lithium-intercalation compound $LiC_x$ which can be intercalated and deintercalated in the negative electrode film per unit area can obtained by a following equation: the capacity of active lithium ions of the pre-lithium-intercalation compound $LiC_x$ which can be intercalated and deintercalated in the negative electrode film per unit area=(a capacity of active lithium ions which can be intercalated and deintercalated in the positive electrode plate per unit area+a capacity of active lithium ions which can be intercalated and deintercalated in the negative electrode plate per unit area)−a capacity of active lithium ions which can be contained in the positive electrode plate per unit area.

Specifically, the lithium-ion battery can be completely discharged and then disassembled to obtain the positive electrode plate and the negative electrode plate, and a unit area of a positive electrode plate and a unit area of a negative electrode plate are respectively cut for the following test.

The positive electrode plate per unit area and a lithium plate per unit area (as a negative electrode) are combined into a button-half battery, which is fully charged at a rate of not more than 0.1 C, and a charge capacity is obtained, that is, the capacity of active lithium ions which is can be intercalated and deintercalated in the positive electrode plate per unit area; then the button-half battery is allowed to standby for a period of time (preferably not less than 5 min, further preferably 5~30 min), and then fully discharged at a rate of not more than 0.1 C (preferably the same as the charge rate) to obtain a discharge capacity, which is the capacity of active lithium ions which is can be contained in the positive electrode plate per unit area.

The negative electrode plate per unit area and a lithium plate per unit area (as a negative electrode) are combined into a button-half battery, and fully charged at a rate of not more than 0.1 C to obtain a charge capacity, that is, the capacity of active lithium ions which is can be intercalated and deintercalated in the negative electrode plate per unit area.

It should be noted that, the cut position of the positive electrode plate and the negative electrode plate is not specifically limited, as long as it ensures that the positive electrode film and the negative electrode film fully cover the positive electrode collector and the negative electrode collector.

In the above test, the charge and discharge voltage ranges are determined according to the specific types of the positive electrode active material and the negative electrode active material, which is determined according to voltages recommended by the manufacturers of the positive negative electrode active material of the commercial purchase, and the charge and discharge voltages corresponding to different positive negative electrode active materials are slightly different.

In the above test, the composition of the electrolyte in the assembled button-half battery and the type of the separator are not specifically limited during selection, and it is preferable to carry out the test in the same conditions, and the change of the specific type has negligible effect on the calculated capacity of active lithium ions of the pre-lithium intercalation compound $LiC_x$ which can be intercalated and deintercalated in the negative electrode film per unit area. The composition of the electrolyte and the type of the separator film can also be prepared by referring to a national standard or industry standard.

The calculation method and the test method for the capacity of active lithium ions of the pre-lithium intercalation compound $LiC_x$ which can be intercalated and deintercalated in the negative electrode film per unit area described above are not only applicable to the newly prepared lithium-ion battery, and also to the lithium-ion battery which has been cycled several times (in particular, the earlier cycle capacity decay is small, such as a lithium-ion battery with a capacity retention rate≥98% after the first 100 cycles).

In the lithium-ion battery according to the third aspect of the present disclosure, preferably, the capacity of the negative electrode active material per unit area/the capacity of the positive electrode active material per unit area=1.2~2.1; more preferably, the capacity of the negative electrode active material per unit area/the capacity of the positive electrode active material per unit area=1.3~2.1.

In the lithium-ion battery according to the third aspect of the present disclosure, the negative electrode film may be provided on one surface of the negative electrode collector, also may be provided on two surfaces of the negative electrode collector. The negative electrode film may further comprise a binder and a conductive agent, the type of the binder and the conductive agent are not specifically limited, and may be selected according to actual need. Preferably, the binder specifically may be one or more selected from a group consisting of styrene butadiene rubber and sodium carboxymethyl cellulose. Preferably, the conductive agent specifically may be one or more selected from a group consisting of conductive carbon black, superconductive carbon black, conductive graphite, acetylene black, ketjen black, graphene and carbon nanotube. The type of the negative electrode collector is also not specifically limited, and may be selected according to actual need, preferably, a copper foil may be used.

In the lithium-ion battery according to the third aspect of the present disclosure, the positive electrode film may be provided on one surface of the positive electrode collector, also may be provided on two surfaces of the positive electrode collector. The positive electrode film further comprises a conductive agent and a binder, the types of the binder and the conductive agent are not specifically limited, and may be selected according to actual need. Preferably, the binder specifically may be one or more selected from a group consisting of polyvinylidene fluoride, polytetrafluoroethylene, terpolymer of vinylidene fluoride-tetrafluoroethylene-propylene, terpolymer of vinylidene fluoride-hexafluoropropylene-tetrafluoroethylene, copolymer of tetrafluoroethylene-hexafluoropropylene and fluorinated acrylate resin. Preferably, the conductive agent may be one or more specifically selected from a group consisting of conductive carbon black, superconductive carbon black, conductive graphite, acetylene black, ketjen black, graphene and carbon nanotube. The type of the positive electrode collector is also not specifically limited, and may be selected according to actual need, preferably an aluminum foil may be used.

Wherein, the specific type of the positive electrode active material is not particularly limited, as long as it can satisfy the intercalation and deintercalation of lithium ions. The positive electrode active material may be a layered-structure material which makes lithium ions diffuse in a two-dimensional space or also a spinel-structure which makes lithium ions diffuse in a three-dimensional space. Preferably, the positive electrode active material may be one or more selected from a group consisting of a lithium transition metal oxide, a compound obtained by adding other transition metal or non-transition metal or non-metal into the lithium transition metal oxide. Specifically, the positive electrode active material may be one or more preferably selected from a group consisting of lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate.

Preferably, the positive electrode active material is olivine-type lithium-containing phosphate. This is because that the olivine-type lithium-containing phosphate itself has a higher structural stability, does not cause a capacity loss due to the structural change as other positive electrode active materials in the cycle process of the lithium-ion battery, therefore the capacity decay of a lithium-ion battery using the olivine-type lithium-containing phosphate is mainly from the loss of the active lithium that can transmit between the positive electrode plate and the negative electrode plate inside the battery (for example, lithium ions are lost due to participation in the formation of the SEI film on the surface of the negative electrode), therefore, when the positive electrode active material is the olivine-type lithium-containing phosphate, the capacity loss of the lithium-ion battery may be further reduced, and the cycle life and the storage life of the lithium-ion battery may be greatly improved.

A general formula of the olivine-type lithium-containing phosphate may be $LiFe_{1-x-y}Mn_xM'_yPO_4$, $0 \leq x \leq 1$, $0 \leq y < 1$, $0 \leq x+y \leq 1$, M' is one or more selected from a group consisting of other transition metal element except for Fe and Mn or non-transition metal element, M' is one or more preferably selected from a group consisting of Cr, Mg, Ti, Al, Zn, W, Nb and Zr. Further preferably, the olivine-type lithium-containing phosphate is one or more selected from a group consisting of lithium iron phosphate, lithium manganese phosphate and lithium ferric manganese phosphate.

In the lithium-ion battery according to the third aspect of the present disclosure, the type of the separator is not specifically limited, and may be any separator material used in current lithium-ion battery, such as polyethylene, polypropylene, polyvinylidene fluoride and a multilayer composite film thereof, but not limited thereto. The separator can be used either as a bare film made of these material or as the bare film with a coating thereon, the coating varies depending on the use conditions of the separator, such as a ceramic coating or also an organic coating.

In the lithium-ion battery according to the third aspect of the present disclosure, the composition of the electrolyte is not specifically limited, and can be prepared according to actual need. Usually, the electrolyte comprises a lithium salt, an organic solvent and an optional additive.

The lithium salt can be an organic lithium salt or an inorganic lithium salt, specifically, the lithium salt can contain at least one of a group consisting of a fluorine element, a boron element and a phosphorus element. Preferably, the lithium salt is one or more specifically selected from a group consisting of lithium hexafluorophosphate, lithium tetrafluoroborate, lithium perchlorate, lithium hexafluoroarsenate, lithium tetrafluorooxalate, $LiN(SO_2R_F)_2$, $LiN(SO_2F)(SO_2R_F)$, bis-trifluoromethanesulfonimide, lithium bis(fluorosulfonyl)imide, lithium bis(oxalate)borate and lithium difluorooxalateborate; further preferably, the lithium salt is one or two selected from a group consisting of $LiPF_6$ and $LiN(SO_2R_F)_2$. Where, the substituent $R_F$ is represented by $C_nF_{2n+1}$, and n is an integer of 1~10.

The organic solvent may comprise a chain ester, may also comprise a cyclic ester, preferably comprise a mixture of a chain ester and a cyclic ester. Wherein, the chain ester may be one or more preferably selected from a group consisting of a chain carbonate and a chain carboxylate; further preferably, the chain ester specifically may be one or more selected from a group consisting of dimethyl carbonate, diethyl carbonate, ethyl methyl carbonate, methyl propyl carbonate, methyl formate, ethyl formate, methyl acetate, ethyl acetate, ethyl propionate, propyl propionate, ethyl butyrate and propyl butyrate. The cyclic ester preferably may be one or more selected from a group consisting of a cyclic carbonate, a cyclic sulfate, a cyclic sulfite and a cyclic carboxylate; more preferably, the cyclic ester specifically may be one or more selected from a group consisting of ethylene carbonate, propylene carbonate, butylene carbonate, vinylene carbonate, ethylene sulfate, ethylene sulfite, propylene sulfite, γ-butyrolactone and tetrahydrofuran. In addition, the organic solvent may further comprise different types of ion liquids and the like. In addition, the organic solvent used in the present disclosure may be used in a single kind or in a combination of two or more kinds in any combination and ratio depending on the application, so the obtained electrolyte has a better electronic conductivity, an ionic conductivity and a viscosity, which facilitates an effective reciprocating motion of lithium ions between the positive electrode plate and the negative electrode plate.

The type of an additive used in the electrolyte is not particularly limited, and may be a film-forming additive on the negative electrode film, a film-forming additive on the positive electrode film, or an additive which can improve certain performance of the battery, such as an additive which improves the overcharge performance of the battery, an additive which improves the high temperature performance of the battery, an additive which improves the low temperature performance of the battery, and the like.

In the lithium-ion battery according to the third aspect of the present disclosure, the lithium-ion battery may be obtained by placing the electrode assembly according to the second aspect of the present disclosure into a packaging case and then injecting the electrolyte and packaged. Wherein, after the electrolyte is injected, the layer of lithium metal provided on the surface of the negative electrode film undergoes a lithium intercalation reaction which is similar to that of the conventional lithium-ion battery during the first cycle of charging under the effect of the electrolyte, the lithium metal or a part of the lithium metal and the negative electrode active material are lithiated to form a pre-lithium-intercalation compound (for example, $LiC_x$) to obtain a negative electrode plate of pre-lithium intercalation. After the negative electrode plate is pre-intercalate with lithium, the potential of the negative electrode plate reduces rapidly, when the potential lowered to the reduction potential of the cyclic ester, the cyclic ester in the negative electrode film is partially reduced and decomposed, and a SEI film with good performance is preferentially formed on the surface of the negative electrode film. The process of reductive decomposition of the cyclic ester to form the SEI film when the electrolyte is injected may cause a generation of irreversible capacity, but the loss from the irreversible capacity will gradually reduced and maintain stable during the subsequent use of the lithium-ion battery, and thus the cycle life and the storage life of the lithium-ion battery can be effectively elongated.

Hereinafter the present disclosure will be described in detail in combination with examples. It should be noted that, the examples described in the present disclosure are only used for explaining the present disclosure, and are not intended to limit the scope of the present disclosure.

EXAMPLE 1

(1) Preparation of a Positive Electrode Plate

Lithium iron phosphate (positive electrode active material, the gram capacity was 140 mAh/g), conductive carbon black (conductive agent) and PVDF (binder) at a mass ratio of 95:3:2 were uniformly mixed with N-methylpyrrolidone (NMP, solvent) and a positive electrode slurry was obtained, then the positive electrode slurry was uniformly coated on two surfaces of an aluminum foil (positive electrode collector), and controlled the coating mass of the positive electrode slurry to be 0.143 g/1000 mm$^2$ (the coating mass was based on the mass of the solid component without the solvent), drying at 120° C. for 15 min, after cold-pressing and compacting, the positive electrode plate was obtained.

The capacity of the positive electrode active material per unit area (calculated with an area of 1000 mm$^2$, the following examples were the same as the comparative examples) =the coating mass of the positive electrode plate per unit area×the mass percentage of the positive electrode active material×the gram capacity of the positive electrode active material=0.143 g×95%×140 mAh/g=19.019 mAh.

(2) Preparation of a Negative Electrode Plate

Artificial graphite (negative electrode active material, the gram capacity was 342 mAh/g), conductive carbon black (conductive agent), SBR (a binder), CMC (thickener) and ethylene carbonate (cyclic ester) at a mass ratio of 95.2:1.5:2.9:0.4:2 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm$^2$ (the coating mass was based on the mass of the solid component without the solvent and the cyclic ester), drying at 120° C. for 15 min, after cold-pressing and compacting, the initial negative electrode plate was obtained.

The lithium plate (theoretical gram capacity was 3861.3 mAh/g) was provided on the surface of the negative electrode film by rolling method, the lithium plate was uniformly distributed on the surface of the negative electrode film, and the mass of the lithium plate provided on the surface of the negative electrode film after rolled was controlled to be 2.23 mg/1000 mm$^2$, and the preparation of the lithium-rich negative electrode plate was completed.

The capacity of the negative electrode active material per unit area (calculated with an area of 1000 mm$^2$, the following examples were the same as the comparative examples) =the coating mass of the negative electrode plate per unit area×the mass percentage of the negative electrode active material×the gram capacity of the negative electrode active material=0.089 g×95.2%×342 mAh/g=28.977 mAh.

The capacity of the lithium metal on the surface of the negative electrode film per unit area (calculated with an area of 1000 mm$^2$, the following examples were the same as the comparative examples)×80%=the theoretical gram capacity of lithium metal×the mass of the lithium metal provided on the surface of the negative electrode film per unit area×80%=3861.3 mAh/g×2.23 mg×80%=6.889 mAh.

(3) Preparation of an Electrolyte

In an argon atmosphere with a water content<10 ppm, ethylene carbonate (EC), propylene carbonate (PC) and dimethyl carbonate (DMC) at a mass ratio of 25:30:35 were mixed to obtain an organic solvent, then the fully dried LiPF$_6$ (lithium salt) was dissolved in the organic solvent and stirred uniformly, an electrolyte was obtained, where, a concentration of the LiPF$_6$ was 1.5 mol/L.

(4) Preparation of a Separator

A polypropylene porous film was selected as a separator.

(5) Preparation of a Lithium-Ion Battery

The negative electrode plate, the separator and the positive electrode plate were stacked in order, making the separator between the positive electrode plate and the negative electrode plate to function as separation, then wound into an electrode assembly, and then the electrode assembly was encircled with an aluminum plastic film, packaged after the prepared electrolyte was injected, and a finished lithium-ion battery was obtained.

EXAMPLE 2

The preparation of the lithium-ion battery was the same as example 1, except that in the preparation of a negative electrode plate (step (2)), ethylene carbonate (cyclic ester) was replaced with vinylene carbonate.

EXAMPLE 3

The preparation of the lithium-ion battery was the same as example 1, except that in the preparation of a negative electrode plate (step (2)), ethylene carbonate (cyclic ester) was replaced with propylene carbonate.

EXAMPLE 4

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), CMC (thickener) and ethylene carbonate (cyclic ester) at a mass ratio of 95.2:1.5:2.9:0.4:3 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm$^2$ (the coating mass was based on the mass of the solid component without the solvent and the cyclic ester), drying at 120° C. for 15 min, after cold-pressing and compacting, the initial negative electrode plate was obtained; the lithium plate was provided on the surface of the negative electrode film by rolling method, the lithium plate was uniformly distributed on the surface of the negative electrode film, and the mass of the lithium plate provided on the surface of the negative electrode film after rolled was controlled to be 2.23 mg/1000 mm$^2$, and the preparation of a lithium-rich negative electrode plate was completed.

EXAMPLE 5

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), CMC (thickener) and ethylene carbonate (cyclic ester) at a mass ratio of 95.2:1.5:2.9:0.4:0.1 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm$^2$ (the coating mass was based on the mass of the solid component without the solvent and the cyclic ester), drying at 120° C. for 15 min, after cold-pressing and compacting, the initial negative electrode plate was obtained; the lithium plate was provided on the surface of the negative electrode film by rolling method, the lithium plate was uniformly distributed on the surface of the negative electrode film, and the mass of the lithium plate provided on the surface of the negative electrode film after rolled was controlled to be 2.23 mg/1000 mm², and the preparation of the lithium-rich negative electrode plate was completed.

EXAMPLE 6

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), CMC (thickener) and ethylene carbonate (cyclic ester) at a mass ratio of 95.2:1.5:2.9:0.4:1 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm² (the coating mass was based on the mass of the solid component without the solvent and the cyclic ester), drying at 120° C. for 15 min, after cold-pressing and compacting, the initial negative electrode plate was obtained; the lithium plate was provided on the surface of the negative electrode film by rolling method, the lithium plate was uniformly distributed on the surface of the negative electrode film, and the mass of the lithium plate provided on the surface of the negative electrode film after rolled was controlled to be 2.23 mg/mm², and the preparation of the lithium-rich negative electrode plate was completed.

EXAMPLE 7

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), CMC (thickener) and ethylene carbonate (cyclic ester) at a mass ratio of 95.2:1.5:2.9:0.4:5 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm² (the coating mass was based on the mass of the solid component without the solvent and the cyclic ester), drying at 120° C. for 15 min, after cold-pressing and compacting, the initial negative electrode plate was obtained; the lithium plate was provided on the surface of the negative electrode film by rolling method, the lithium plate was uniformly distributed on the surface of the negative electrode film, and the mass of the lithium plate provided on the surface of the negative electrode film after rolled was controlled to be 2.23 mg/1000 mm², and the preparation of the lithium-rich negative electrode plate was completed.

EXAMPLE 8

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), CMC (thickener) and ethylene carbonate (cyclic ester) at a mass ratio of 95.2:1.5:2.9:0.4:9 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm² (the coating mass was based on the mass of the solid component without the solvent and the cyclic ester), drying at 120° for 15 min, after cold-pressing and compacting, the initial negative electrode plate was obtained; the lithium plate was provided on the surface of the negative electrode film by rolling method, the lithium plate was uniformly distributed on the surface of the negative electrode film, and the mass of the lithium plate provided on the surface of the negative electrode film after rolled was controlled to be 2.23 mg/1000 mm², and the preparation of the lithium-rich negative electrode plate was completed.

EXAMPLE 9

The preparation of the lithium-ion battery was the same as example 1, except that in the preparation of a negative electrode plate (step (2)): the strip-shaped lithium strips provided with the intervals were provided on the surface of the negative electrode film by rolling, the width of each strip-shaped lithium strip was 2 mm, the interval between the lithium strips was 2 mm, and the average mass of the lithium strips provided on the surface of the negative electrode film was controlled to be 2.23 mg/1000 mm², and the preparation of the lithium-rich negative electrode plate was completed after rolling.

EXAMPLE 10

The preparation of the lithium-ion battery was the same as example 1, except that in the preparation of a negative electrode plate (step (2)): a layer of loose lithium powder was uniformly distributed on the surface of the negative electrode film, and the mass of the lithium powder was controlled to be 2.23 mg/1000 mm², the loose lithium powder was compacted on the surface of the negative electrode film after rolled, and the preparation of the lithium-rich negative electrode plate was completed.

EXAMPLE 11

The preparation of the lithium-ion battery was the same as example 1, except that in the preparation of a negative electrode plate (step (2)): the mass of the lithium plate provided on the surface of the negative electrode film after rolled was 1.20 mg/1000 mm²; the capacity of the lithium metal on the surface of the negative electrode film per unit area×80%=the theoretical gram capacity of lithium metal× the mass of the lithium metal provided on the surface of the negative electrode film per unit area×80%=3861.3 mAh/g× 1.20 mg×80%=3.707 mAh.

EXAMPLE 12

The preparation of the lithium-ion battery was the same as example 1, except that in the preparation of a negative electrode plate (step (2)): the mass of the lithium plate provided on the surface of the negative electrode film after rolled was 2.40 mg/1000 mm²; the capacity of the lithium metal on the surface of the negative electrode film per unit area×80%=the theoretical gram capacity of lithium metal× the mass of the lithium metal provided on the surface of the negative electrode film per unit area×80%=3861.3 mAh/g× 2.40 mg×80%=7.414 mAh.

EXAMPLE 13

The preparation of the lithium-ion battery was the same as example 1, except that in the preparation of a negative electrode plate (step (2)): the coating mass of the negative electrode slurry was 0.097 g/1000 mm$^2$; the capacity of the negative electrode active material per unit area=the coating mass of the negative electrode plate per unit area×the mass percentage of the negative electrode active material×the gram capacity of the negative electrode active material=0.097 g×95.2%×342 mAh/g=31.582 mAh.

EXAMPLE 14

The preparation of the lithium-ion battery was the same as example 1, except that in the preparation of a negative electrode plate (step (2)): the coating mass of the negative electrode slurry was 0.110 g/1000 mm$^2$; the capacity of the negative electrode active material per unit area=the coating mass of the negative electrode plate per unit area×the mass percentage of the negative electrode active material×the gram capacity of the negative electrode active material=0.110 g×95.2%×342 mAh/g=35.814 mAh.

COMPARATIVE EXAMPLE 1

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), and CMC (thickener) at a mass ratio of 95.2:1.5:2.9:0.4 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm$^2$ (the coating mass was based on the mass of the solid component without the solvent), drying at 120° C. for 15 min, after cold-pressing and compacting, the initial negative electrode plate was obtained; the lithium plate was provided on the surface of the negative electrode film by rolling method, the lithium plate was uniformly distributed on the surface of the negative electrode film, and controlled the mass of the lithium plate provided on the surface of the negative electrode film after rolled to be 2.23 mg/1000 mm$^2$, and the preparation of the lithium-rich negative electrode plate was completed.

COMPARATIVE EXAMPLE 2

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder), CMC (thickener) and ethylene carbonate (cyclic ester) at a mass ratio of 95.2:1.5:2.9:0.4:2 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm$^2$ (the coating mass was based on the mass of the solid component without the solvent and the cyclic ester), drying at 120° C. for 15 min, after cold-pressing and compacting, the negative electrode plate was completed without lithium supplementation.

COMPARATIVE EXAMPLE 3

The preparation of the lithium-ion battery was the same as example 1, except that in the preparation of a negative electrode plate (step (2)): artificial graphite (negative electrode active material, the gram capacity was 342 mAh/g), conductive carbon black (conductive agent), SBR (binder) and CMC (thickener) at a mass ratio of 95.2:1.5:2.9:0.4 were uniformly mixed with deionized water (solvent) and a negative electrode slurry was obtained, then the negative electrode slurry was uniformly coated on two surfaces of a copper foil (negative electrode collector), and the coating mass of the negative electrode slurry was controlled to be 0.089 g/1000 mm$^2$ (the coating mass was based on the mass of the solid component without the solvent), drying at 120° C. for 15 min, after cold-pressing and compacting, the initial negative electrode plate was obtained without lithium supplementation.

Next test processes and results of the performance of the lithium-ion battery were described.

(1) Test of Cycle Life of the Lithium-Ion Battery at Room Temperature

In an environment of 25° C., the lithium-ion battery was discharged to a voltage of 2.5V at 1 C (i.e. a current value that a theoretical capacity was completely discharged within 1 h), and standby was performed for 5 min, then the test was started. The test process was: the lithium-ion battery was charged to a voltage of 3.65V at a constant current of 1 C, and charged to a current of 0.05 C at a constant voltage of 3.65V, standby was performed for 5 min; then the lithium-ion battery was discharged to a voltage of 2.5V at a constant current of 1 C, the discharge capacity at this time was taken as the discharge capacity of the first cycle. The lithium-ion battery was performed for multiple cycles of the charging and discharging test method according to the above method until the discharge capacity of the lithium-ion battery was decayed to 80% of the discharge capacity of the first cycle, and the number of cycles of the lithium-ion battery was recorded.

(2) Test of Cycle Life of the Lithium-Ion Battery at High Temperature

In an environment of 60° C., the lithium-ion battery was discharged to a voltage of 2.5V at 1 C (i.e. a current value that a theoretical capacity was completely discharged within 1 h), and standby was performed for 5 min, then the test was started. The test process was: the lithium-ion battery was charged to a voltage of 3.65V at a constant current of 1 C, and charged to a current of 0.05 C at a constant voltage of 3.65V, standby was performed for 5 min; then the lithium-ion battery was discharged to a voltage of 2.5V at a constant current of 1 C, the discharge capacity at this time was taken as the discharge capacity of the first cycle. The lithium-ion battery was performed for multiple cycles of the charging and discharging test method according to the above method until the discharge capacity of the lithium-ion battery was decayed to 80% of the discharge capacity of the first cycle, and the number of cycles of the lithium-ion battery was recorded.

(3) Test of Storage Life of the Lithium-Ion Battery at High Temperature

In an environment of 25° C., the lithium-ion battery was discharged to a voltage of 2.5V at 1 C (i.e. a current value that a theoretical capacity was completely discharged within 1 h), and standby was performed for 5 min, then the test was started. The test process was: the lithium-ion battery was charged to a voltage of 3.65V at a constant current of 0.5 C, and charged to a current of 0.05 C at a constant voltage of 3.65V, standby was performed for 5 min; then the lithium-ion battery was discharged to a voltage of 2.5V at a constant current of 0.5 C, the discharge capacity at this time was taken as the discharge capacity of the first cycle. Then the lithium-ion battery was fully charged at 0.5 C again, and stored in an environment of 60° C. for 90 days, then taken out and placed in an environment of 25° C., and standby was performed for 2 h, then the lithium-ion battery was discharged to a voltage of 2.5V at a constant current of 0.5 C, and standby was performed for 5 min, charged to a voltage of 3.65V at a constant current of 0.5 C, and charged to a current of 0.05 C at a constant voltage of 3.65V, standby was performed for 5 min, discharged to a voltage of 2.5V at a constant current of 0.5 C, the discharge capacity at this time was the discharge capacity after stored for 90 days.

The capacity retention rate of the lithium-ion battery after stored at 60° C. for 90 days=(the discharge capacity after stored 90 days/the discharge capacity of the first cycle)× 100%.

TABLE 1

Test results of parameter and performance of examples 1-14 and comparative examples 1-3

|  | Relative content of cyclic ester | Lithium metal capacity on the surface of the negative electrode film per unit area × 80% (mAh) | Capacity of active lithium ions of $LiC_x$ which could be intercalated and deintercalated in the negative electrode film per unit area (mAh) | Capacity of the negative electrode active material per unit area (mAh) | Capacity of the positive electrode active material per unit area (mAh) |
|---|---|---|---|---|---|
| Comparative example 1 | 0 | 6.889 | 6.81 | 28.977 | 19.019 |
| Comparative example 2 | 2.1% | 0 | 0 | 28.977 | 19.019 |
| Comparative example 3 | 0 | 0 | 0 | 28.977 | 19.019 |
| Example 1 | 2.1% | 6.889 | 6.82 | 28.977 | 19.019 |
| Example 2 | 2.1% | 6.889 | 6.80 | 28.977 | 19.019 |
| Example 3 | 2.1% | 6.889 | 6.81 | 28.977 | 19.019 |
| Example 4 | 3.2% | 6.889 | 6.83 | 28.977 | 19.019 |
| Example 5 | 0.1% | 6.889 | 6.80 | 28.977 | 19.019 |
| Example 6 | 1.1% | 6.889 | 6.81 | 28.977 | 19.019 |
| Example 7 | 5.3% | 6.889 | 6.84 | 28.977 | 19.019 |
| Example 8 | 9.5% | 6.889 | 6.82 | 28.977 | 19.019 |
| Example 9 | 2.1% | 6.889 | 6.81 | 28.977 | 19.019 |
| Example 10 | 2.1% | 6.889 | 6.81 | 28.977 | 19.019 |
| Example 11 | 2.1% | 3.707 | 3.65 | 28.977 | 19.019 |
| Example 12 | 2.1% | 7.414 | 7.32 | 28.977 | 19.019 |
| Example 13 | 2.1% | 6.889 | 6.81 | 31.582 | 19.019 |
| Example 14 | 2.1% | 6.889 | 6.81 | 35.814 | 19.019 |

|  | Equation 1 | Equation 2 | Equation 3 | Number of cycles at 25° C. | Number of cycles at 60° C. | Capacity retention rate after stored at 60° C. for 90 days |
|---|---|---|---|---|---|---|
| Comparative example 1 | 1.52 | 1.12 | 1.12 | 6000 | 1600 | 95.5% |
| Comparative example 2 | 1.52 | / | / | 3000 | 780 | 89.4% |
| Comparative example 3 | 1.52 | / | / | 2700 | 750 | 88.2% |
| Example 1 | 1.52 | 1.12 | 1.12 | 13000 | 3000 | 99.7% |
| Example 2 | 1.52 | 1.12 | 1.12 | 12900 | 2980 | 99.7% |
| Example 3 | 1.52 | 1.12 | 1.12 | 13200 | 2990 | 99.7% |
| Example 4 | 1.52 | 1.12 | 1.12 | 13500 | 3050 | 99.7% |
| Example 5 | 1.52 | 1.12 | 1.12 | 9500 | 2080 | 97.3% |
| Example 6 | 1.52 | 1.12 | 1.12 | 11000 | 2780 | 98.1% |
| Example 7 | 1.52 | 1.12 | 1.12 | 13000 | 3080 | 99.3% |
| Example 8 | 1.52 | 1.12 | 1.12 | 9300 | 2580 | 98.7% |
| Example 9 | 1.52 | 1.12 | 1.12 | 12000 | 2900 | 99.6% |
| Example 10 | 1.52 | 1.12 | 1.12 | 12500 | 2950 | 99.6% |
| Example 11 | 1.52 | 1.28 | 1.28 | 7600 | 1980 | 89.4% |
| Example 12 | 1.52 | 1.10 | 1.10 | 14200 | 3240 | 95.2% |
| Example 13 | 1.66 | 1.22 | 1.22 | 10100 | 2500 | 98.2% |
| Example 14 | 1.88 | 1.38 | 1.39 | 9200 | 2100 | 97.6% |

Note:
Per unit area was calculated with an area of 1000 mm²
Equation 1 = capacity of the negative electrode active material per unit area/capacity of the positive electrode active material per unit area.
Equation 2 = capacity of the negative electrode active material per unit area/(capacity of the positive electrode active material per unit area + lithium metal capacity on the surface of the negative electrode film per unit area × 80%).
Equation 3 = capacity of the negative electrode active material per unit area/(capacity of the positive electrode active material per unit area + capacity of active lithium ions of the pre-lithium-intercalation compound $LiC_x$ which could be intercalated and deintercalated in the negative electrode film per unit area).

As could be seen from the comparison of the test results of comparative examples 1-2 in table 1, the number of cycles of the lithium-ion battery in which lithium was supplemented on the negative electrode plate increased significantly when the capacities were decayed to 80% respectively at the room temperature of 25° C. and the high temperature of 60° C., and the capacity retention rate of the lithium-ion battery in which lithium was supplemented on the negative electrode plate after stored at 60° C. for 90 days was also significantly higher than that of the lithium-ion battery in which lithium was not supplemented on the negative electrode plate, this showed that the lithium-supplementation of the negative electrode plate could significantly improve the cycle life and storage life of the lithium-ion battery. At the same time, as could be seen from the comparison of the test results of comparative example 2-3 in table 1, there was not significant effect on improving the cycle life and storage life of the lithium-ion battery when the cyclic ester was added into the negative electrode slurry but lithium was not supplemented on the negative electrode plate.

As could be seen from the comparison of the test results of comparative example 1 and examples 1-3 in table 1, the cycle life and storage life, especially the cycle life, of the lithium-ion battery could be effectively improved after the cyclic ester was added into the negative electrode slurry and applied to the lithium ion battery which lithium was supplemented on the negative electrode plate. Wherein, the number of cycles of the lithium-ion battery almost increased one time when the capacity was decayed to 80% at the room temperature of 25° C. and the high temperature of 60° C., and the capacity the lithium-ion battery after stored at 60° C. for 90 days almost did not decay, however the capacity in comparative example 1 was decayed by about 5%. The possible reason was that, after an electrolyte was injected into a battery, the lithium metal on the surface of the negative electrode film immediately underwent a rapid lithium intercalation reaction, at the same time the cyclic ester was partly consumed and preferentially formed a SEI film on the surface of the negative electrode plate, so the speed of the lithium intercalation of the negative electrode plate could be effectively controlled, the uniformity of the lithium intercalation of the negative electrode plate could be ensured, while the bond strength between the negative electrode film and the negative electrode collector could also be increased, the bond force of the negative electrode plate was improved. The cyclic ester which had not been consumed in the forming process of the SEI film was remained in the negative electrode film, and continued to participate in the dissolving-repairing process of the SEI film on the surface of the negative electrode plate in the subsequent cycle process of the battery; adding the cyclic ester into the negative electrode film directly could sufficiently infiltrate the internal porosity of the negative electrode plate and the surface of the negative electrode active material, which in turn was beneficial to preferentially form a SEI film with better performance on the surface of the negative electrode plate, for example increasing the uniformity and densification of the SEI film, this not only could effectively improve the film formation effect on the surface of the negative electrode plate, improve security and stability of the lithium-ion battery, but also could ensure that the lithium-ion battery had a longer cycle life and storage life.

As could be seen from the comparison of the test results of example 1 and examples 4-8 in table 1, the cycle life and the storage life could be effectively improved when different contents of the cyclic ester were added into the negative electrode slurry. Wherein, the content of the cyclic ester had an optimal value, which should neither be too large nor too small, which would result in lowering in the improvement of the cycle life and storage life of the lithium-ion battery, for example, a slight amount of the cyclic ester was added in example 5, a higher amount of the cyclic ester was added example 8, the number of cycles of the lithium-ion battery when the capacity was decayed to 80% at the room temperature of 25° C. and the high temperature of 60° C. was reduced by about ¼ compared with example 1, and the capacity the lithium-ion battery after stored at 60° C. for 90 days was reduced by about 3%.

As could be seen from the comparison of the test results of examples 9-10 and example 1 in table 1, the change of the process of the lithium supplementation had not significant effect on the cycle life and the storage life of the lithium-ion battery, therefore the appropriate process of the lithium supplementation could be selected according to the actual situation.

As could be seen from the comparison of the test results of examples 11-12 and example 1 in table 1, the increase of the mass of the lithium supplemented on the negative electrode film surface had significant effect on the cycle life and storage life of the lithium-ion battery, wherein, within a reasonable range, the lithium-ion battery had a longer cycle life with the mass of the lithium supplemented on the negative electrode film surface increased, and the decay speed of the capacity of the lithium-ion battery after stored the same numbers of days also slowed down.

As could be seen from the comparison of the test results of examples 13-14 and example 1 in table 1, under the same coating mass of the positive electrode slurry, the change of the coating mass of the negative electrode slurry had not significant effect on the cycle life and the storage life of the lithium-ion battery, only within a certain range, as the coating mass of the negative electrode slurry increased, the reaction activity of the negative electrode plate per unit area increased, the loss rate of active lithium was accelerated when SEI film was repaired, and thus the cycle life and storage life of the lithium-ion battery was slightly lowered. In addition, the mass of the lithium metal on the surface of the negative electrode film was not changed, as the coating mass of the negative electrode slurry increased, the mass of the lithium supplemented on the negative electrode film surface was relatively reduced, which also slightly lowered the cycle life and storage life of the lithium-ion battery.

Finally test processes and results of the performance of the negative electrode plate were described.

A special double-sided adhesive tape was attached to a steel plate, and the double-sided adhesive tape had a width of 20 mm and a length of 90~150 mm. The negative electrode plate to be tested was taken, and a sample of the negative electrode plate with a width of 30 mm and a length of 100~160 mm was cut by a blade. The cut sample of the negative electrode plate was attached to the double-sided adhesive tape with the test surface facing downwardly, and then rolled along the same direction three times by a pressing roll. A paper strip having a width equal to the sample of the negative electrode plate and a length greater than the sample of the negative electrode plate by 80~200 mm was inserted under the sample of the negative electrode plate, and fixed with a corrugated adhesive tape. One end of the steel plate not attached with the sample of the negative electrode plate was fixed to a lower end of a mechanical testing machine by a lower fixture, the paper strip was folded upwardly, fixed by an upper fixture, and the upper fixture was adjusted to a suitable position, the paper strip was lifted but an extra force was not exerted to the sample of the negative electrode plate, the mechanical testing machine was started and the paper strip was pulled upwardly at a speed of 50 mm/min to bring the negative electrode film to be stripped from the negative electrode collector wherein, the bond force of the negative electrode plate was characterized by the measured peel force between the negative electrode film and the negative electrode collector.

TABLE 2

Test results of performance of the negative electrode plate of examples 4-8 and comparative example 1

| | bond force of the negative electrode plate (N/m) |
|---|---|
| Comparative example 1 | 5 |
| Example 4 | 15 |
| Example 5 | 10 |
| Example 6 | 14 |
| Example 7 | 13 |
| Example 8 | 11 |

As could be seen from the comparison of the test results of examples 4-8 and example 1 in table 1, after adding an appropriate amount of the cyclic ester to the negative electrode film, the bond force of the negative electrode plate could be effectively improved, wherein when the content of the cyclic ester was 0.1%, the bond force of the negative electrode plate increased from 5 N/m of comparative example 1 to 10 N/m. This was because the presence of the cyclic ester in the negative electrode film could not only ensure that an excellent SEI film was formed on the surface of the negative electrode plate and the film formation effect on the surface of the negative electrode film was effectively improved after the injection of the electrolyte, but also effectively control the lithium intercalation speed of the negative electrode plate, ensure the uniformity of the lithium intercalation of the negative electrode plate, increase the bond strength between the negative electrode film and the negative electrode collector, improve the bond force of the negative electrode plate, improve the structure stability of the negative electrode plate, and in turn be beneficial to obtain the lithium-ion battery having longer cycle life and storage life. As could be seen from the comparison of the test results of examples 4-8 in table 1, when the bond force of the negative electrode plate was greater than or equal to 11 N/m, improvement of the cycle life and storage life of the lithium-ion battery was more significant.

As could be seen from the comparison of the test results of examples 4-8 in table 2, effects of different contents of the cyclic esters on the bond force of the negative electrode plate were certainly different, as the content of the cyclic ester increased, the bond force of the negative electrode plate increased to a certain extent, but as the content of the cyclic ester further increased, the viscosity and flowability of the negative electrode slurry increased, which caused the bond strength between the negative electrode film and the negative electrode collector started to be decreased, and the bond force of the negative electrode plate started to be lowered.

According to the disclosure and teach of the above description, the skilled in the art may also make appropriate changes and modifications to the above embodiments. Therefore, the present disclosure is not limited to the specific implementation manners disclosed and described as above, some modifications and changes of the present disclosure are also intended to fall within the scope of the claims. In addition, although some specific terms were used in the present disclosure, but they were used only to describe conveniently, and does not constitute any limitation to the present disclosure.

What is claimed is:

1. A lithium-rich negative electrode plate, comprising a negative electrode collector and a negative electrode film, the negative electrode film being provided on a surface of the negative electrode collector and comprising a negative electrode active material, the lithium-rich negative electrode plate further comprising a layer of lithium metal provided on a surface of the negative electrode film;

wherein the negative electrode film further comprises a cyclic ester added into it, the cyclic ester is capable of forming a film on the negative electrode plate, a dielectric constant of the cyclic ester is larger than or equal to 10, and a reduction potential of the cyclic ester relative to $Li/Li^+$ is lower than or equal to 1.5V;

a capacity of the negative electrode active material per unit area/(a capacity of the positive electrode active material per unit area+a capacity of the lithium metal on the surface of the negative electrode film per unit area×80%)≥1.10;

a ratio of the capacity of the negative electrode active material per unit area/the capacity of the positive electrode active material per unit area is between 1.2 and 2.1;

a range of the capacity of the lithium metal on the surface of the negative electrode film per unit area×80% is between 6.889 mAh/1000 $mm^2$ and 7.414 mAh/1000 $mm^2$; and a content of the cyclic ester is 0.1%~9.5% of a mass of the negative electrode active material.

2. The lithium-rich negative electrode plate according to claim 1, wherein the reduction potential of the cyclic ester relative to $Li/Li^+$ is 1.5~0.9V.

3. The lithium-rich negative electrode plate according to claim 1, wherein the cyclic ester is one or more selected from a group consisting of cyclic carbonate, cyclic sulfate, cyclic sulfite and cyclic carboxylate.

4. The lithium-rich negative electrode plate according to claim 3, wherein the cyclic ester is one or more selected from a group consisting of ethylene carbonate, vinylene carbonate, propylene carbonate, butylene carbonate, ethylene sulfate, ethylene sulfite, propylene sulfite and γ-butyrolactone.

5. The lithium-rich negative electrode plate according to claim 1, wherein a mass of the lithium metal is 0.5%~5% of a total mass of the negative electrode film.

6. An electrode assembly, comprising:

a negative electrode plate;

a positive electrode plate; and a separator provided between the negative electrode plate and the positive electrode plate;

wherein the negative electrode plate is the lithium-rich negative electrode plate according to claim 1.

7. The electrode assembly according to claim 6, wherein the capacity of the negative electrode active material per unit area/the capacity of the positive electrode active material per unit area=1.3~2.1.

8. A lithium-ion battery, comprising:

a negative electrode plate comprising a negative electrode collector and a negative electrode film, the negative electrode film being provided on a surface of the negative electrode collector and comprising a negative electrode active material;

a positive electrode plate comprising a positive electrode collector and a positive electrode film, the positive electrode film being provided on a surface of the positive electrode collector and comprises a positive electrode active material; and a separator provided between the negative electrode plate and the positive electrode plate; and an electrolyte;

wherein the negative electrode plate is a pre-lithium-intercalation negative electrode plate;

the negative electrode film further comprises a cyclic ester added into it, the cyclic ester is capable of forming a film on the negative electrode plate, a dielectric constant of the cyclic ester is greater than or equal to 10, and a reduction potential of the cyclic ester relative to Li/Li$^+$ is lower than or equal to 1.5V;

the negative electrode active material at least comprises a carbon-based negative electrode material, and the carbon-based negative electrode material in the negative electrode film exists in a form of a pre-lithium-intercalation compound LiC$_x$ formed by lithiation with a lithium metal, 12≤x≤150;

a capacity of the negative electrode active material per unit area/(a capacity of the positive electrode active material per unit area+a capacity of active lithium ions of the pre-lithium-intercalation compound LiC$_x$ which can be intercalated and deintercalated in the negative electrode film per unit area)≥1.10;

a ratio of the capacity of the negative electrode active material per unit area/the capacity of the positive electrode active material per unit area is between 1.2 and 2.1;

a range of the capacity of active lithium ions of the pre-lithium-intercalation compound LiC$_x$ which can be intercalated and deintercalated in the negative electrode film per unit area is between 6.80 mAh/1000 mm$^2$ and 7.32 mAh/1000 mm$^2$; and a content of the cyclic ester is 0.1%~9.5% of a mass of the negative electrode active material.

9. The lithium-ion battery according to claim 8, wherein the reduction potential of the cyclic ester relative to Li/Li$^+$ is 1.5~0.9V.

10. The lithium-ion battery according to claim 8, wherein the cyclic ester is one or more selected from a group consisting of cyclic carbonate, cyclic sulfate, cyclic sulfite and cyclic carboxylate.

11. The lithium-ion battery according to claim 10, wherein the cyclic ester is one or more selected from a group consisting of ethylene carbonate, vinylene carbonate, propylene carbonate, butylene carbonate, ethylene sulfate, ethylene sulfite, propylene sulfite and γ-butyrolactone.

12. The lithium-ion battery according to claim 8, wherein 12≤x≤50.

13. The lithium-ion battery according to claim 8, wherein the capacity of the negative electrode active material per unit area/the capacity of the positive electrode active material per unit area=1.3~2.1.

14. The lithium-ion battery according to claim 8, wherein a peel force between the negative electrode film and the negative electrode collector is greater than or equal to 10 N/m.

* * * * *